US012672593B2

(12) United States Patent
Hui et al.

(10) Patent No.: US 12,672,593 B2
(45) Date of Patent: Jul. 7, 2026

(54) AGRICULTURAL IMPLEMENT HITCHES WITH ROTATIONAL MOTION

(71) Applicant: CNH Industrial Canada, Ltd., Saskatoon (CA)

(72) Inventors: Ka Catherine Po Hui, Saskatoon (CA); Matthew J. Stefaniuk, Saskatoon (CA); Ehsan Sharbati, Saskatoon (CA); Jack R. Chappell, Saskatoon (CA); Jackie Donald Turner, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 373 days.

(21) Appl. No.: 18/364,114

(22) Filed: Aug. 2, 2023

(65) Prior Publication Data

US 2025/0040461 A1 Feb. 6, 2025

(51) Int. Cl.
*A01B 59/042* (2006.01)
*A01C 7/08* (2006.01)

(52) U.S. Cl.
CPC .............. *A01B 59/042* (2013.01); *A01C 7/08* (2013.01)

(58) Field of Classification Search
CPC ................................. A01B 59/042; A01C 7/08
See application file for complete search history.

(56) References Cited

U.S. PATENT DOCUMENTS

| | | | | |
|---|---|---|---|---|
| 4,711,461 | A | * 12/1987 | Fromberg | ................. B60D 1/02 |
| | | | | 403/57 |
| 5,386,680 | A | * 2/1995 | Friesen | ................. A01B 59/042 |
| | | | | 56/DIG. 14 |
| 5,647,604 | A | * 7/1997 | Russell | .................... B60D 1/04 |
| | | | | 280/492 |
| 7,837,216 | B1 | * 11/2010 | Greaves, Jr. | ............. B60D 1/54 |
| | | | | 280/491.4 |
| 8,505,952 | B1 | * 8/2013 | Choquette | ................. B60D 1/54 |
| | | | | 280/491.2 |
| 8,746,725 | B2 | 6/2014 | Harkcom et al. | |
| 9,271,439 | B2 | 3/2016 | Bourgault et al. | |
| 9,736,975 | B2 | 8/2017 | Williams et al. | |
| 11,407,263 | B1 | * 8/2022 | Hazen | .................... B60D 1/145 |
| 11,602,962 | B2 | * 3/2023 | Redden | .................. B60D 1/243 |
| 2004/0061309 | A1 | * 4/2004 | Shoffner | ................ B60D 1/145 |
| | | | | 280/494 |
| 2019/0380253 | A1 | * 12/2019 | Thielicke | ............. A01B 49/027 |
| 2022/0264790 | A1 | * 8/2022 | Beaujot | .................. A01C 7/208 |

* cited by examiner

*Primary Examiner* — Matthew R Buck
(74) *Attorney, Agent, or Firm* — Fletcher Yoder, P.C.

(57) ABSTRACT

A hitch system for coupling a first agricultural implement to a second agricultural implement includes a clevis coupled to an end of a first hitch of the first agricultural implement. The clevis includes a first connector end having a first opening and a second connector end having a second opening. The hitch system also includes a pin configured to be disposed through the first opening and the second opening of the clevis and a connector of a second hitch of the second agricultural implement to couple the first agricultural implement to the second agricultural implement. The clevis is configured to rotate about a rotational axis that is parallel with a direction of travel of the first agricultural implement and the second agricultural implement when being towed by a work vehicle.

18 Claims, 11 Drawing Sheets

AGRICULTURAL IMPLEMENT HITCHES WITH ROTATIONAL MOTION

BACKGROUND

The present disclosure relates generally to agricultural implement hitches with rotational motion.

Generally, a seeding implement (e.g., seeder such as an air cart, box drill, air cart and drill, etc.) is towed behind a tractor or other work vehicle via a mounting bracket secured to a rigid frame of the seeding implement. The seeding implement typically includes multiple row units distributed across a width of the seeding implement. Each row unit is configured to deposit seeds at a desired depth beneath a soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural material (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver the agricultural material (e.g., seeds, fertilizer) to the row units of the seeding implement. The air cart generally includes a storage tank (e.g., a pressurized tank), an air source (e.g., a blower), and a metering system. The agricultural material is typically gravity fed from the storage tank to the metering system, which distributes a volume of the agricultural material into an air stream generated by the air source. The air stream carries the agricultural material to the row units via conduits extending between the air cart and the seeding implement.

The air cart may be towed behind the seeding implement or the seeding implement may be towed behind the air cart. Sometimes the air cart and drill combination may be utilized to seed rolling hills. Due to the rolling hills, in certain circumstances, the air cart may roll to the left and the drill will rotate to the right (or vice versa). In this situation, the standard connection (e.g., hitch) between the air cart and the drill does not allow this opposite roll to happen and instead internalizes the forces resulting in the twisting of the metal of the connection to absorb the air and drill positions. This may damage the hitch.

SUMMARY

In one embodiment, a hitch system for coupling a first agricultural implement to a second agricultural implement includes a clevis coupled to an end of a first hitch of the first agricultural implement. The clevis includes a first connector end having a first opening and a second connector end having a second opening. The hitch system also includes a pin configured to be disposed through the first opening and the second opening of the clevis and a connector of a second hitch of the second agricultural implement to couple the first agricultural implement to the second agricultural implement. The clevis is configured to rotate about a rotational axis that is parallel with a direction of travel of the first agricultural implement and the second agricultural implement when being towed by a work vehicle.

In one embodiment, a seeding system includes a seeder configured to be towed by a work vehicle and including a first hitch having an end and a clevis coupled to the end. The clevis includes a first connector end having a first opening and a second connector end having a second opening. The seeding system also includes an air cart configured to be towed by the work vehicle and comprising a second hitch having a connector. The seeding system further includes a pin configured to be disposed through the first opening and the second opening of the clevis and the connector of the second hitch to couple the seeder to the air cart. The clevis is configured to rotate about a rotational axis that is parallel with a direction of travel of the seeder and the air cart when being towed by the work vehicle.

In one embodiment, a method for coupling a first agricultural implement to a second agricultural implement includes providing a clevis coupled to an end of a first hitch of the first agricultural implement. The clevis comprises a first connector end having a first opening and a second connector end having a second opening. The method also includes inserting a connector of a second hitch of the second agricultural implement between the first connector end and the second connector end of the clevis. The method further includes disposing a pin through the first opening and the second opening of the clevis and the connector of the second hitch to couple the first agricultural implement to the second agricultural implement. The clevis is configured to rotate about a rotational axis that is parallel with a direction of travel of the first agricultural implement and the second agricultural implement when being towed by a work vehicle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
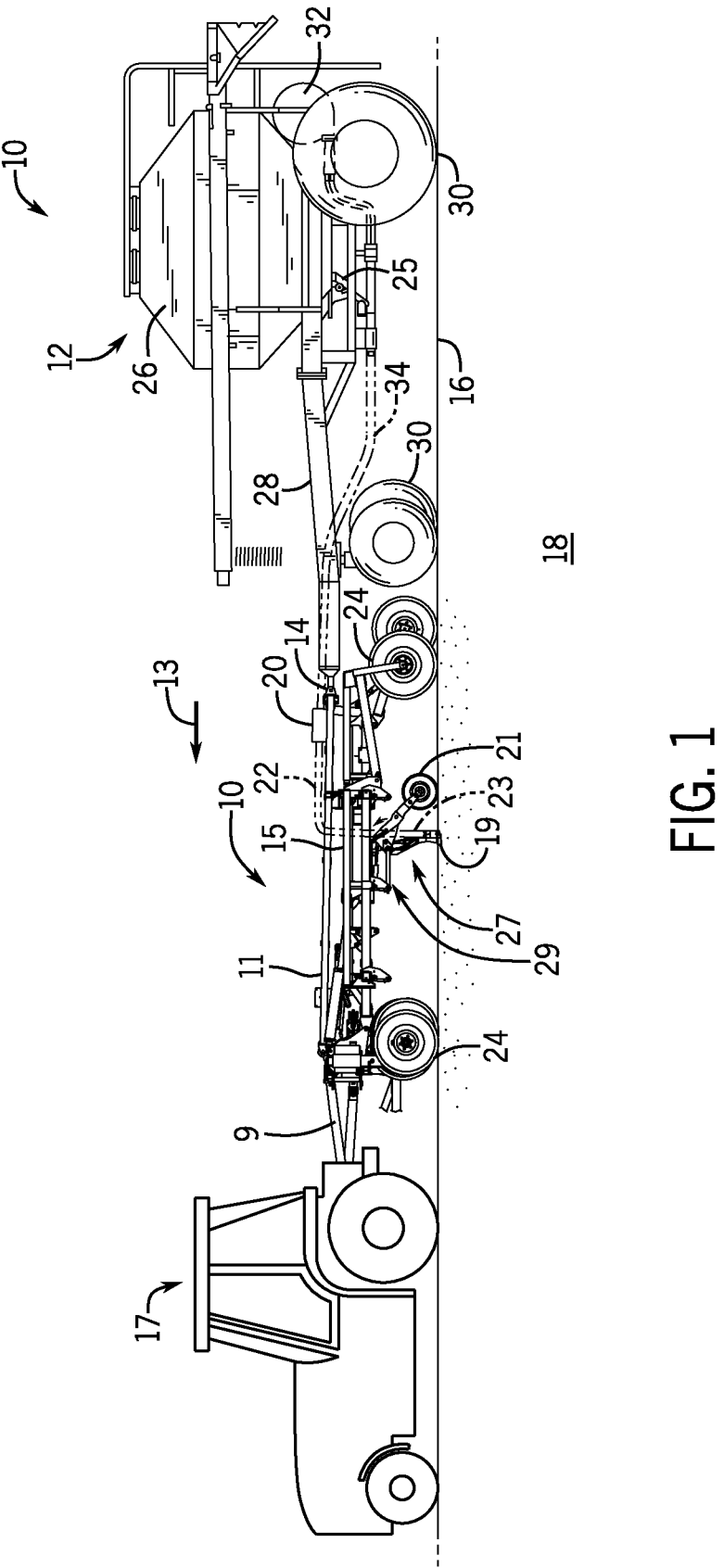
FIG. 1 is a side view of a seeding system having a tractor, an air cart, and a seeder, in accordance with aspects of the present disclosure.

Turning now to the drawings, FIG. 1 is a side view of an embodiment of an agricultural material application system 10 (e.g., a seeding system or a planter system). The agricultural material application system 10 includes an agricultural implement 11 (e.g., seeding implement or seeder) coupled to an air cart 12. In certain embodiments, a seeder may be an air cart, box drill, or air cart and drill. In the illustrated embodiment, the air cart 12 is towed behind the agricultural implement 11, relative to a direction of travel 13. In addition, the agricultural implement 11 is coupled to a work vehicle 17 by a first hitch system 9, and the air cart 12 is coupled to the agricultural implement 11 by a second hitch system 14. While the agricultural implement 11 is towed between the work vehicle 17 and the air cart 12 in the illustrated embodiment, it should be appreciated that the agricultural implement may be towed behind the air cart. Furthermore, it should be appreciated that the implement and the air cart may be part of a single unit that is towed behind the work vehicle, or the agricultural implement and the air cart may be elements of a self-propelled vehicle.

The agricultural implement 11 may deposit rows of seeds into the soil as the agricultural implement 11 is towed across a surface 16 of an agricultural field 18 by the work vehicle 17. The agricultural implement 11 includes a tool frame 15 coupled to a row unit 27 (e.g., a ground engaging opener system), a distribution header 20, a hose 22, and wheel assemblies 24. The wheel assemblies 24 may contact the surface 16 to enable the agricultural implement 11 to be towed by the work vehicle 17. As the agricultural implement 11 moves in the direction of travel 13, a row of seeds may be deposited into the soil by the row unit 27. Although only one row unit 27 is shown, the agricultural implement 11 may include multiple row units 27 organized in one or more rows across a width of the agricultural implement 11.

In the illustrated embodiment, the agricultural implement 11 is a precision drill, and operation of the precision drill is generally described herein to facilitate discussion and understanding of various features and operations of the agricultural material application system 10. However, it should be understood that the agricultural implement 11 may be any of a variety of seeding implements or other types of agricultural implements. With the forgoing in mind and with reference to FIG. 1, in the illustrated embodiment, each row unit 27 includes an opener 19, a press wheel 21, a seed tube 23, and a hydraulic cylinder 29. When the opener 19 engages the soil, the opener 19 may exert a force that excavates a trench into the soil as the row unit 27 travels through the agricultural field 18. A position of the press wheel 21 controls the depth of the opener 19, and the hydraulic cylinder 29 controls the downward force (e.g., a down pressure). For example, the opener 19 may be controlled to establish a target depth of the trench. Seeds may then be deposited into the excavated trench via the seed tube 23. Then, the press wheel 21 may facilitate movement of the excavated soil into the trench to cover the seeds and compress the soil covering the seeds.

Regardless of a type of the agricultural implement 11, the air cart 12 may centrally store seeds and distribute the seeds to the row unit 27. Accordingly, the air cart 12 includes an agricultural material meter 25, a storage tank 26, a frame 28, wheels 30, and an air source 32. In the depicted embodiment, the frame 28 is coupled to the tool frame 15 via the hitch 14. The wheels 30 may contact the surface 16 to enable the air cart 12 to be towed along with the agricultural implement 11. Additionally, the storage tank 26 may centrally store the seeds for distribution. In some embodiments, the storage tank 26 may include multiple compartments for storing different types of granular materials. For example, a first compartment may store the seeds while a second compartment may store a dry fertilizer. In such configurations, the air cart 12 may deliver both seed and fertilizer to the agricultural implement 11 via separate distribution systems, or as a mixture through a single distribution system.

Generally, the distribution system may control an amount of seeds distributed to the agricultural field 18 using the agricultural material meter 25. For example, the agricultural material meter 25 may be controlled to increase or decrease the amount of seeds distributed to the agricultural field 18. As depicted, the agricultural material meter 25 is mounted to the bottom of the storage tank 26, which may enable the storage tank 26 to supply seeds to the agricultural material meter 25. The agricultural material meter 25 may then distribute the seeds to the distribution header 20 via a respective hose 34. The distribution headers 20 may then distribute the seeds to one or more row units 27 via the hose 22. In this manner, the agricultural material meter 25 may control distribution of seeds from the storage tank 26 to the row units 27 and into the trenches.

As described in greater detail below, the hitch system 14 is configured to enable the agricultural implement 11 (e.g., seeder such as an air cart, box drill, air cart and drill, etc.) and the air cart 12 to rotate in opposite circumferential directions (e.g., when being towed on rolling hills) about a rotational axis of the hitch system 14. The rotational axis is parallel with the direction of travel 13. This rotational axis keeps additional forces from being transferred to the hitch system, thus, reducing stress on the hitch system 14 and reducing the chances of damage to the hitch system 14. The entire system also enables rotation about a vertical axis (e.g., in the Y-direction) and rotation about a horizontal axis (e.g., in the Z-direction) (see FIG. 5) when connected to other pieces of equipment. While the implement 11 and the air cart 12 are shown as connected by the hitch system 14, the hitch system 14 may be utilized to connect any two agricultural implements.

Figure 2:
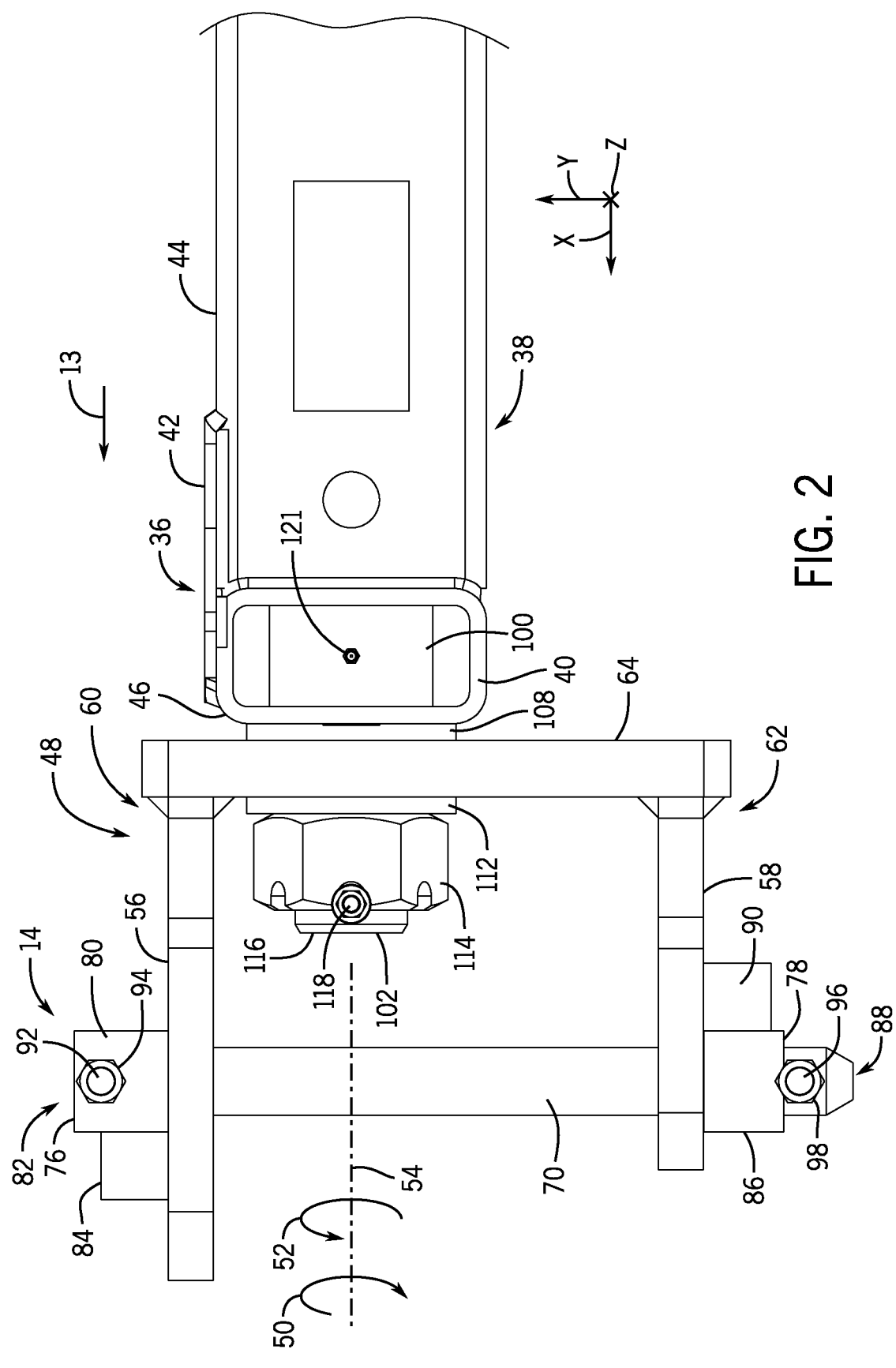
FIG. 2 is a side view of a hitch system coupled to an end of a hitch, in accordance with aspects of the present disclosure.
Figure 3:
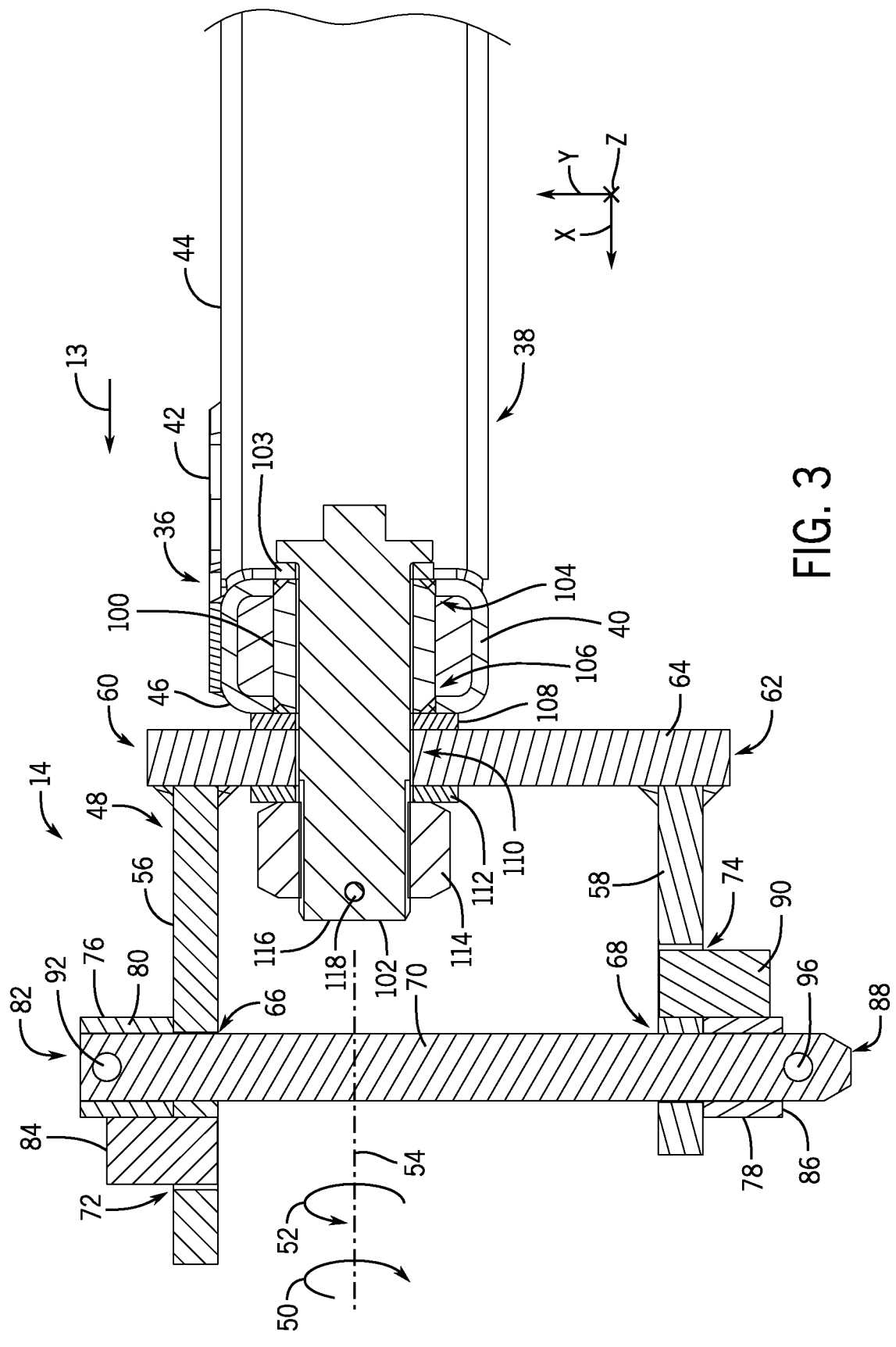
FIG. 3 is a cross-sectional side view of the hitch system coupled to the end of the hitch, in accordance with aspects of the present disclosure.
Figure 4:
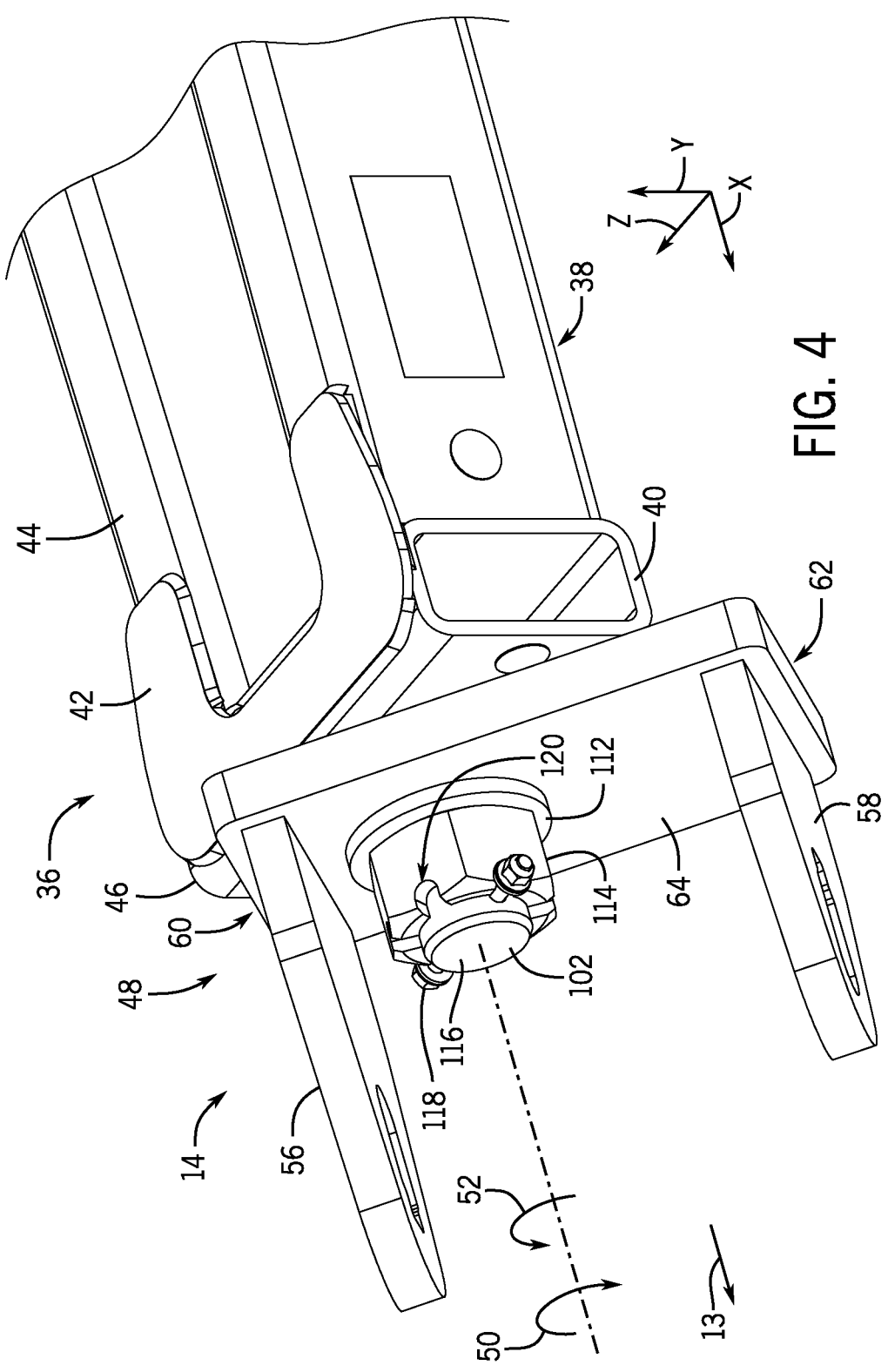
FIG. 4 is a perspective view of a portion of the hitch system coupled to the end of the hitch, in accordance with aspects of the present disclosure.

FIGS. 2-4 are different views of the hitch system 14 coupled to an end 36 of a hitch 38. In certain embodiments, the hitch 38 is the rear hitch of a first agricultural implement for a tow behind configuration with a second agricultural implement. In certain embodiments, the hitch 38 is the rear hitch of the agricultural implement 11 (e.g., seeder or drill) in FIG. 1 for a tow behind configuration with the air cart 12. In certain embodiments, the hitch 38 is the rear hitch of the air cart 12 in FIG. 1 for a tow behind configuration with the agricultural implement 11 (e.g., seeder or drill).

A beam structure 40 (e.g., extruded beam) is coupled (e.g., welded) to the end 36 of the hitch 38. A gusset 42 is coupled (e.g., welded) to top surfaces 44, 46 of the end 36 of hitch 38 and the beam structure 40, respectively, to couple the beam structure 40 to the end 36 of the hitch 38.

The hitch system 14 includes a clevis 48 pivotally coupled to the beam structure 40 on the end 36 of the hitch 38. The clevis 48 is configured to rotate in a first circumferential direction 50 and a second circumferential direction 52 (opposite the first circumferential direction 50) about a rotational axis 54. The rotational axis 54 is parallel with the direction of travel 13 when the first agricultural implement and the second agricultural implement (or the seeder 11 and the air cart 12) are being towed by a work vehicle (e.g., work vehicle 17 in FIG. 1).

The clevis 48 includes a first connector end 56 and a second connector end 58 extending from ends 60, 62 of a plate 64 extending between the first connector end 56 and the second connector end 58. The plate 64 extends in a direction orthogonal to the rotational axis 54, while both the first connector end 56 and the second connector end 58 are in a direction parallel with the rotational axis 54. As depicted, the first connector end 56 is longer than the second connector end 58 in the direction parallel with the rotational axis 54. In certain embodiments, the second connector end 58 may be longer than the first connector end 56 in the direction parallel with the rotational axis 54. In certain embodiments, the first connector end 56 and the second connector end 58 are the same length in the direction parallel with the rotational axis 54.

The first connector end 56 includes a first opening 66 and the second connector end 58 includes a second opening 68. The hitch system 14 includes a pin 70 configured to be disposed (e.g., inserted) through the first opening 66 and the second opening 68 and a connector (e.g., through openings in the connector such as connector 126 in FIG. 5) of a hitch of a second agricultural implement (e.g., air cart 12) to couple the first agricultural implement (e.g., seeder 11 in FIG. 1) to the second agricultural implement.

The first connector end 56 includes a third opening 72 and the second connector end 58 includes a fourth opening 74. The hitch system 14 includes a first collar 76 and a second collar 78. The first collar 76 includes a portion 80 configured to be disposed about an end 82 of the pin 70 extending through the first opening 66. The first collar 76 also includes a portion 84 configured to be inserted within the third opening 72 to fix the position of the first collar 76 when disposed about the end 82 of the pin 70 and prevent the pin 70 from rotating. The second collar 78 includes a portion 86 configured to be disposed about an end 88 of the pin 70 extending through the second opening 68. The second collar 78 also includes a portion 90 configured to be inserted within the fourth opening 74 to fix the position of the second collar 78 when disposed about the end 88 of the pin 70 and prevent the pin 70 from rotating. As depicted in FIG. 2, a fastener 92 (e.g., bolt) is inserted through corresponding openings on the end 82 of the pin 70 and the portion 80 of the first collar 76 and secured with a nut 94 to secure the first collar 76 to the pin 70. In certain embodiments, the fastener 92 may only extend through the pin 70 so that the fastener 92 and the first connector end 56 flank the first collar 76. As depicted in FIG. 2, a fastener 96 (e.g., bolt) is inserted through an opening in the end 88 of the pin 70 and secured with a nut 98 so that the fastener 96 and the second connector end 58 flank the second collar 78. In certain embodiments, the fastener 96 is inserted through corresponding openings on the end 88 of the pin 70 and the portion 86 of the second collar 78 and secured with the nut 98 to secure the second collar 78 to the pin 70. The first collar 76 and the second collar 78 (in conjunction with the fasteners 92, 96) secure the pin 70 within the first connector end 56 and the second connector end 58 of the clevis 48 and the connector of the second hitch (and also to keep the pin 70 from rotating). The pin 70 when inserted within first connector end 56 and the second connector end 58 of the clevis 48 (and/or the connector of the second hitch) is orthogonal to the rotation axis 54.

Figure 6:
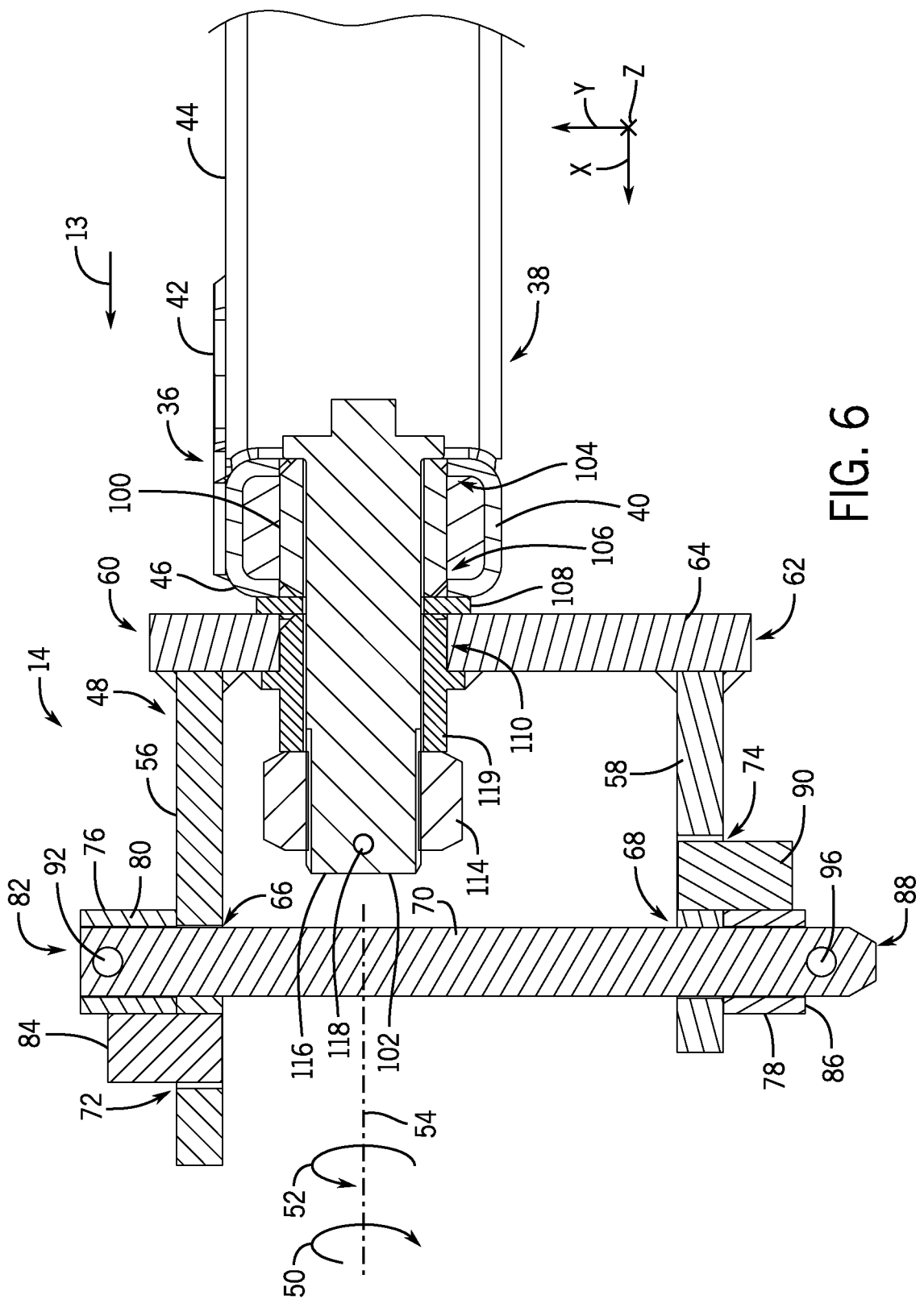
FIG. 6 is a cross-sectional side view of the hitch coupled to the end of the hitch (e.g., having an additional tube), in accordance with aspects of the present disclosure.
Figure 7:
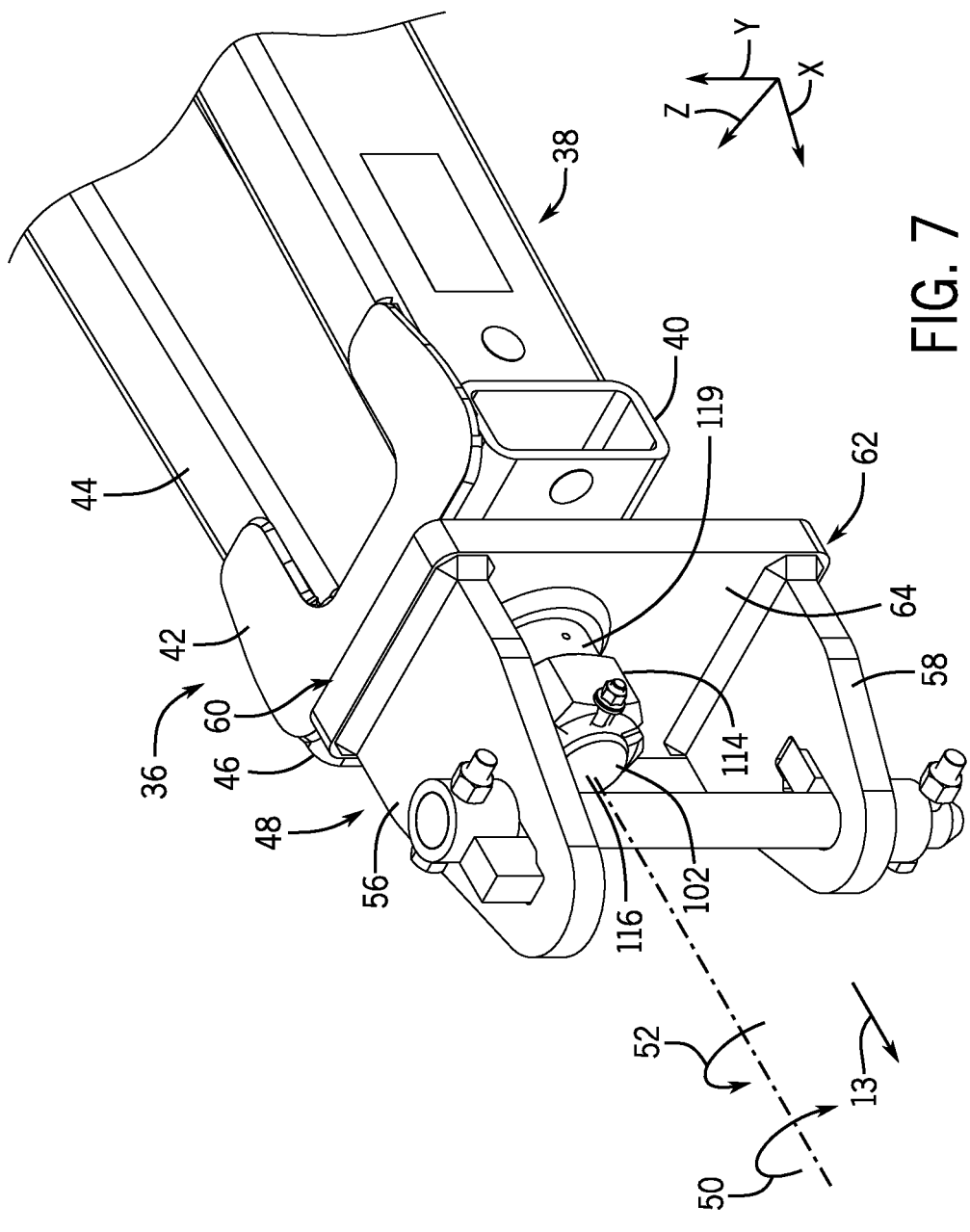
FIG. 7 is a perspective view of a portion of the hitch system in FIG. 6 coupled to the end of the hitch, in accordance with aspects of the present disclosure.

The hitch system 14 includes a tube 100 disposed within the beam structure 40. The hitch system 14 also includes a pin 102 configured to couple the clevis 48 to the beam structure 40 on the end 36 of the hitch 38. As depicted in FIG. 3, the pin 102 is first inserted through a washer 103 (adjacent a head of the pin 102), a first opening 104 (facing away from the clevis 48) in the beam structure 40, the tube 100, and a second opening 106 (facing toward the clevis 48). The pin 102 is then inserted through first washer 108, a corresponding opening 110 in the plate 64 of the clevis 48, and then a washer 112. A nut 114 is disposed about an end 116 of the pin 102 to secure the clevis 48 to the beam structure 40 on the end 36 of the hitch 38. A fastener (e.g. nut and bolt or pin) 118 is inserted (in a direction orthogonal to the rotational axis 54) through the end 116 of the pin 102 to secure the nut 114 on the pin 102. The nut 114 includes recesses 120 for the fastener 118 to pass through. In certain embodiments, the number of washers utilized in various locations may vary. For example, 0, 1 or more washers may be disposed at the head of the pin 102. In certain embodiments, the number of washers between the beam structure 40 and the clevis 48 (e.g., plate 64) may be 0, 1, or more washers. In certain embodiments, the number of washers between the nut 114 and the plate 64 may be 0, 1, or more washers. The clevis 48 rotates about the pin 102 and the rotational axis 54. The clevis 48 is also configured to be removed from the beam structure 40 on the end 36 of the hitch 38 by removing the fastener 118 and the nut 114. In certain embodiments, the pin 102 may be inserted and secured in an opposite orientation from that depicted in FIGS. 2-4. In certain embodiments, the pin 102 is coated with a coating (e.g., manganese phosphate coating) to retain lubricity. In addition, the tube 100 includes a grease zerk 121 for lubricant (e.g., grease) to lubricate the pin 102 within the tube 100. In certain embodiments, the hitch system 14 may include an additional tube 119 that is also lubricated as shown in FIGS. 6 and 7. As depicted in FIGS. 6 and 7, the additional tube 119 is located adjacent to the washer 108 and extends through the plate 64. The pin also extends 102 through the additional tube 119.

Figure 5:
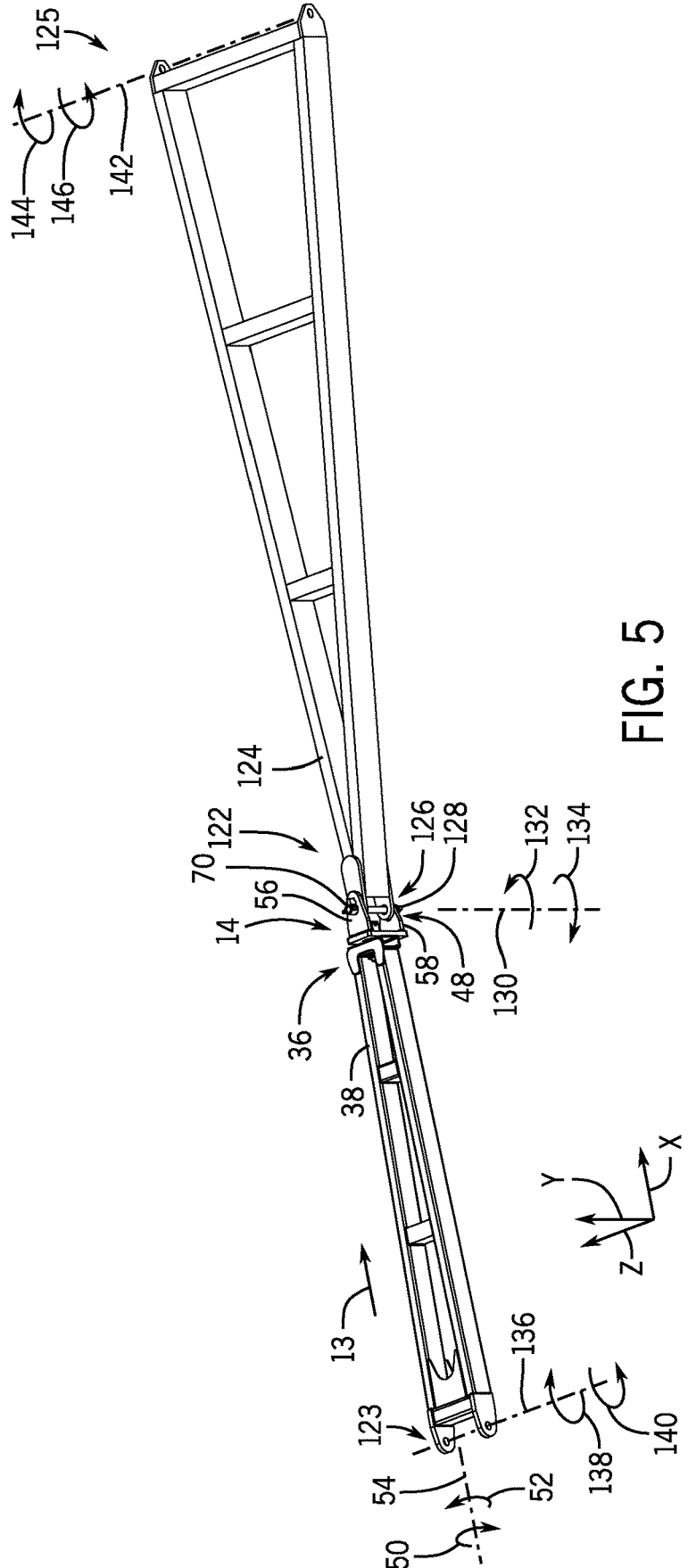
FIG. 5 is a perspective view of hitches of agricultural implements coupled via the hitch system in FIGS. 2-4, in accordance with aspects of the present disclosure.

FIG. 5 is a perspective view of hitches of agricultural implements coupled via the hitch system 14 in FIGS. 2-4. The hitch system 14 is as described above in FIGS. 2-4. As depicted in FIG. 5, the end 36 of the first hitch 38 of a first agricultural implement is coupled to the clevis 48 while an end 123 of the first hitch 38 is coupled to the first agricultural implement. An end 122 of a second hitch 124 of a second agricultural implement includes a connector 126 while an end 125 of the second hitch 124 is coupled to the second agricultural implement. The connector 126 includes openings 128 to receive the pin 70. The connector 126 is configured to be disposed between the first connector end 56 and the second connector end 58 of the clevis 48. As depicted in FIG. 5, the pin 70 is inserted within the first connector end 56 and the second connector end 58 of the clevis 48 and the connector 126 to couple the first agricultural implement to the second agricultural implement.

The clevis 48 rotates about the rotational axis 54. This enables the first agricultural implement to rotate in the first circumferential direction 50 and the second circumferential direction 52 (opposite the first circumferential direction 50) or vice versa about the rotational axis 54. The rotational axis 54 is parallel with the direction of travel 13 when the first agricultural implement and the second agricultural implement are being towed by a work vehicle (e.g., work vehicle 17 in FIG. 1). This rotational axis 54 keeps additional forces from being transferred to the hitch system 14, thus, reducing stress on the hitch system 14 and reducing the chances of damage to the hitch system 14. The entire system also enables rotation about a vertical axis 130 (e.g., in the Y-direction) (e.g., via the pin 70) as indicated by arrows 132 and 134. In addition, the entire system further enables rotation about a horizontal axis 136 (e.g., in the Z-direction) at the end 123 where the first hitch 38 is coupled to the first agricultural implement as indicated by arrows 138 and 140. Further, the entire system even further enables rotation about a horizontal axis 142 (e.g., in the Z-direction) at the end 125 where the second hitch 124 is coupled to the second agricultural implement as indicated by arrows 144 and 146.

Figure 8:
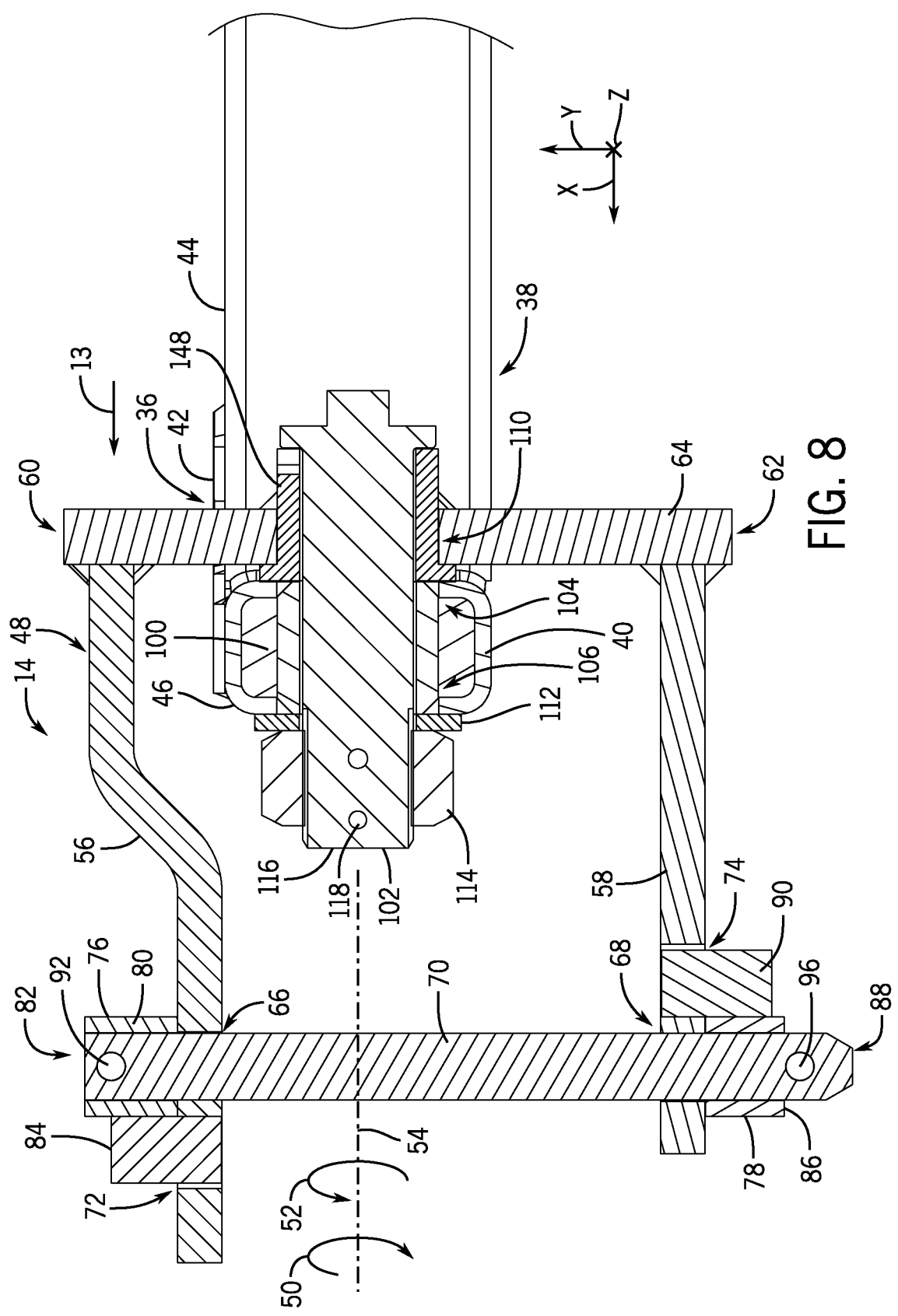
FIG. 8 is a cross-sectional side view of the hitch coupled to the end of the hitch (e.g., having plate of clevis disposed between beam structure and the end of the hitch), in accordance with aspects of the present disclosure.
Figure 9:
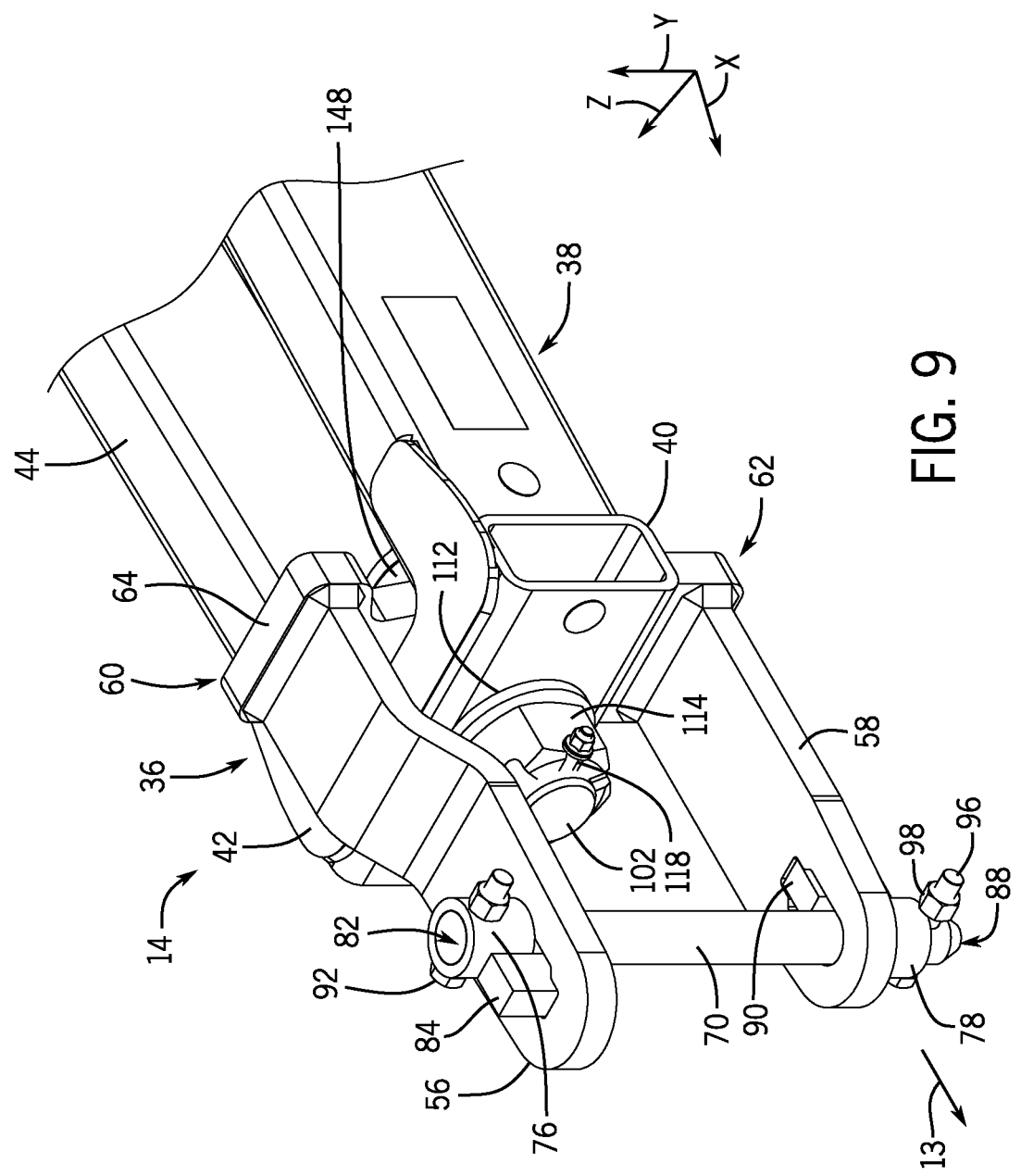
FIG. 9 is a perspective view of a portion of the hitch system in FIG. 8 coupled to the end of the hitch, in accordance with aspects of the present disclosure.

FIGS. 8 and 9 are different views of the hitch system 14 coupled to the end 36 of the hitch 38 having an alternative configuration. As depicted in FIGS. 8 and 9, the plate 64 of the clevis 48 is disposed between the beam structure 40 and the end 36 of the hitch 38. As depicted in FIG. 8, the pin 102 extends through a tube 148 (adjacent a head of the pin 102), the corresponding opening 110 in the plate 64 of the clevis 48, the first opening 104 in the beam structure 40, the tube 100, the second opening 106, and then the washer 112. The nut 114 is disposed about the end 116 of the pin 102 to secure both the beam structure 40 and the clevis 48 on the end 36 of the hitch 38. The fastener (e.g. nut and bolt or pin) 118 is inserted (in a direction orthogonal to the rotational axis 54) through the end 116 of the pin 102 to secure the nut 114 on the pin 102. The clevis 48 functions as described above in FIGS. 2-4. The tubes 100 and 148 are also lubricated.

Figure 10:
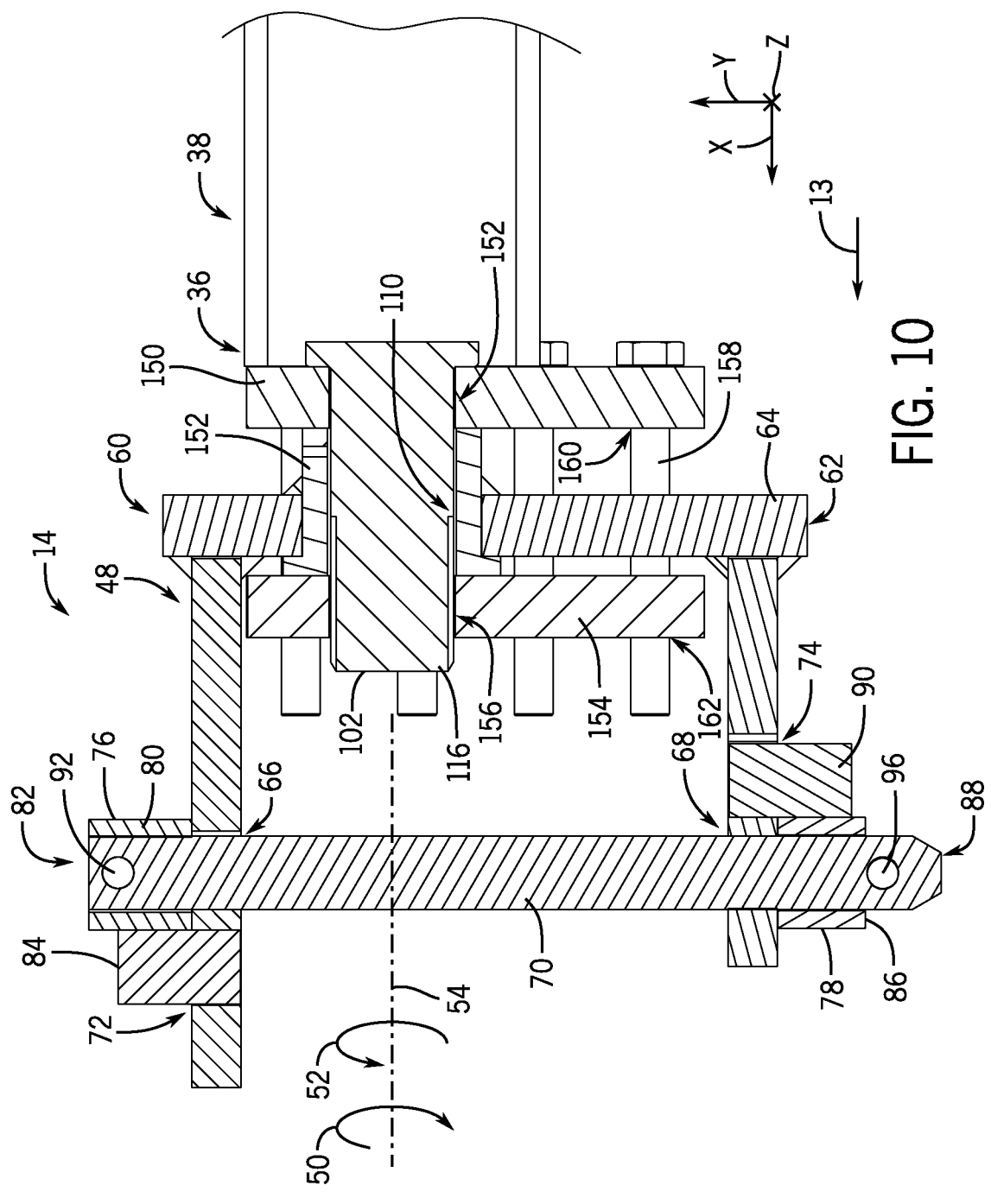
FIG. 10 is a cross-sectional side view of the hitch coupled to the end of the hitch (e.g., having plates to secure clevis to end of the hitch), in accordance with aspects of the present disclosure.
Figure 11:
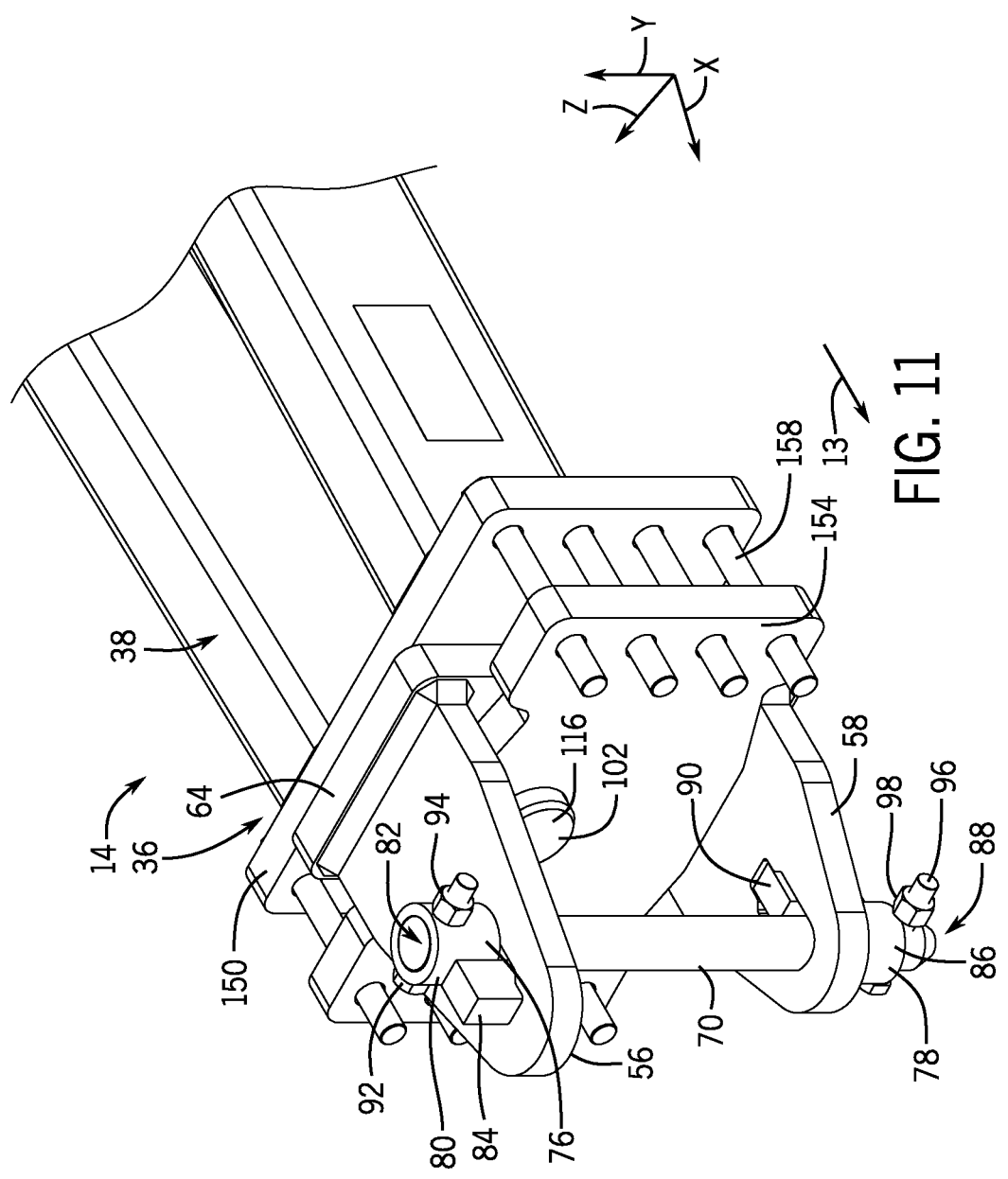
FIG. 11 is a perspective view of a portion of the hitch system in FIG. 10 coupled to the end of the hitch, in accordance with aspects of the present disclosure.

FIGS. 10 and 11 are different views of the hitch system 14 coupled to the end 36 of the hitch 38 having another alternative configuration. As depicted in FIGS. 10 and 11, the clevis 48 is coupled to end 36 of the hitch 38 in a different manner. In a particular, a plate 150 is coupled (e.g., welded) to the end 36 of the hitch 38. As depicted in FIGS. 10 and 11, the pin 102 extends through an opening 152 of the plate 150, a tube 152 (which is lubricated), and the corresponding opening 110 in the plate 64 of the clevis 48. The pin 102 also extends through another plate 154 (via opening 156). The plates 150 and 154 are disposed on opposite sides of the plate 64 of the clevis 48 (e.g., flanking the plate 64). The plate 154 is secured to the plate 150 via fasteners 158 (e.g., nuts and bolts), thus, securing the clevis 48 to the end 36 of the hitch 38. As depicted in FIG. 11, 4 fasteners 158 are disposed on opposite sides of clevis 48 that extend through the plates 150, 154. The number of fasteners 158 may vary. The fasteners 158 pass through corresponding openings 160, 162 on the plates 150, 154, respectively. The clevis 48 functions as described above in FIGS. 2-4 while the plates 150, 154 remain stationary.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A hitch system for coupling a first agricultural implement to a second agricultural implement, comprising:
   a clevis coupled to an end of a first hitch of the first agricultural implement, wherein the clevis comprises a first connector end having a first opening and a second connector end having a second opening;
   a pin configured to be disposed through the first opening and the second opening of the clevis and a connector of a second hitch of the second agricultural implement to couple the first agricultural implement to the second agricultural implement, wherein the clevis is configured to rotate about a rotational axis that is parallel with a direction of travel of the first agricultural implement and the second agricultural implement when being towed by a work vehicle;
   a first collar configured to be disposed about a first end of the pin extending through the first opening; and
   a second collar configured to be disposed about a second end of the pin extending through the second opening, wherein the first collar and the second collar are configured to block rotational movement of the pin about a longitudinal axis of the pin.

2. The hitch system of claim 1, wherein the clevis is configured to enable the first agricultural implement to rotate in a first circumferential direction about the rotational axis and the second agricultural implement to rotate in a second circumferential direction about the rotational axis that is opposite the first circumferential direction.

3. The hitch system of claim 1, wherein the first connector end comprises a third opening adjacent the first opening and the second connector end comprises a fourth opening adjacent the second opening, and wherein the first collar comprises a first portion configured to be inserted within the third opening to fix a first position of the first collar when disposed about the first end of the pin, and the second collar comprises a second portion configured to be inserted within the fourth opening to fix a second position of the second collar when disposed about the second end of the pin.

4. The hitch system of claim 1, wherein the pin when inserted within the first opening and the second opening is configured to be orthogonal to the rotational axis.

5. The hitch system of claim 1, wherein the clevis is configured to be removable from the end of the first hitch.

6. The hitch system of claim 1, further comprising an additional pin configured to extend through the end of the first hitch and a plate of the clevis to couple the clevis to the end of the first hitch, wherein the plate extends between and couples the first connector end and the second connector end.

7. The hitch system of claim 6, further comprising a beam structure coupled to the first end of the hitch and a tube disposed within the beam structure, wherein the additional pin is configured to be inserted within the tube when coupling the clevis to the end of the first hitch, wherein the tube comprises a grease zerk to lubricate the additional pin.

8. The hitch system of claim 7, further comprising an additional tube that extends through the plate, and the additional pin is configured to be inserted within the additional tube when coupling the clevis to the end of the hitch.

9. The hitch system of claim 1, wherein the first agricultural implement comprises a seeder and the second agricultural implement comprises an air cart.

10. A seeding system, comprising:

a seeder configured to be towed by a work vehicle and comprising a first hitch having an end and a clevis coupled to the end, wherein the clevis comprises a first connector end having a first opening and a second connector end having a second opening;

an air cart configured to be towed by the work vehicle and comprising a second hitch having a connector;

a pin configured to be disposed through the first opening and the second opening of the clevis and the connector of the second hitch to couple the seeder to the air cart, wherein the clevis is configured to rotate about a rotational axis that is parallel with a direction of travel of the seeder and the air cart when being towed by the work vehicle;

a first collar configured to be disposed about a first end of the pin extending through the first opening; and a second collar configured to be disposed about a second end of the pin extending through the second opening, wherein the first collar and the second collar are configured to block rotational movement of the pin about a longitudinal axis of the pin.

11. The seeding system of claim 10, wherein the clevis is configured to enable the seeder to rotate in a first circumferential direction about the rotational axis and the air cart to rotate in a second circumferential direction about the rotational axis that is opposite the first circumferential direction.

12. The seeding system of claim 10, wherein the first connector end comprises a third opening adjacent the first opening and the second connector end comprises a fourth opening adjacent the second opening, and wherein the first collar comprises a first portion configured to be inserted within the third opening to fix a first position of the first collar when disposed about the first end of the pin, and the second collar comprises a second portion configured to be inserted within the fourth opening to fix a second position of the second collar when disposed about the second end of the pin.

13. The seeding system of claim 10, wherein the pin when inserted within the first opening and the second opening is configured to be orthogonal to the rotational axis.

14. The seeding system of claim 10, wherein the clevis is configured to be removable from the end of the first hitch.

15. The seeding system of claim 10, further comprising an additional pin configured to extend through the end of the first hitch and a plate of the clevis to couple the clevis to the end of the first hitch, wherein the plate extends between and couples the first connector end and the second connector end.

16. The seeding system of claim 15, further comprising a beam structure coupled to the first end of the hitch and a tube disposed within the beam structure, wherein the additional pin is configured to be inserted within the tube when coupling the clevis to the end of the first hitch, wherein the tube comprises a grease zerk to lubricate the additional pin.

17. The seeding system of claim 16, further comprising an additional tube that extends through the plate, and the additional pin is configured to be inserted within the additional tube when coupling the clevis to the end of the hitch.

18. A method for coupling a first agricultural implement to a second agricultural implement, comprising:

providing a clevis coupled to an end of a first hitch of the first agricultural implement, wherein the clevis comprises a first connector end having a first opening and a second connector end having a second opening;

inserting a connector of a second hitch of the second agricultural implement between the first connector end and the second connector end of the clevis;

disposing a pin through the first opening and the second opening of the clevis and the connector of the second hitch to couple the first agricultural implement to the second agricultural implement, wherein the clevis is configured to rotate about a rotational axis that is parallel with a direction of travel of the first agricultural implement and the second agricultural implement when being towed by a work vehicle;

disposing a first collar about a first end of the pin extending through the first opening; and disposing a second collar about a second end of the pin extending through the second opening, wherein the first collar and the second collar are configured to block rotational movement of the pin about a longitudinal axis of the pin.

* * * * *